United States Patent [19]

Dahlquist

[11] Patent Number: 4,997,413
[45] Date of Patent: Mar. 5, 1991

[54] ROBOT WRIST

[75] Inventor: Håkan Dahlquist, Västerås, Sweden

[73] Assignee: ASEA Brown Boveri AB, Västeras, Sweden

[21] Appl. No.: 337,077

[22] Filed: Apr. 12, 1989

[30] Foreign Application Priority Data

Apr. 13, 1988 [SE] Sweden ................................ 8801356

[51] Int. Cl.5 ............................................. F16H 1/28
[52] U.S. Cl. .................................... 475/163; 74/421 A
[58] Field of Search ............... 74/800, 421 A; 901/29, 901/38; 475/162, 163

[56] References Cited

U.S. PATENT DOCUMENTS

| | | | |
|---|---|---|---|
| 2,919,587 | 1/1960 | Sundt | 74/800 X |
| 2,953,944 | 9/1960 | Sundt | 74/800 X |
| 3,528,310 | 9/1970 | Haentjens | 74/421 A |
| 4,068,536 | 1/1978 | Stackhouse | 901/29 X |
| 4,105,372 | 8/1978 | Mishina et al. | 74/421 A X |
| 4,136,571 | 1/1979 | Frölichsthol | 74/421 A X |
| 4,507,046 | 3/1985 | Sugimoto et al. | 901/29 X |
| 4,550,630 | 11/1985 | Remus | 74/800 |
| 4,683,406 | 7/1987 | Ikeda et al. | 901/38 X |
| 4,684,312 | 8/1987 | Antoszewski et al. | 901/29 X |
| 4,808,898 | 2/1989 | Pearson | 901/38 X |
| 4,818,174 | 4/1989 | Arpiarian et al. | 901/29 X |
| 4,826,230 | 5/1989 | Truchet | 901/29 X |
| 4,846,015 | 2/1989 | Keppler et al. | 901/29 X |

Primary Examiner—Dwight Diehl
Attorney, Agent, or Firm—Watson, Cole, Grindle & Watson

[57] ABSTRACT

A robot wrist comprising a plurality of mutaully rotatable tubular parts arranged in series with each other and a tubular member (2), such as a tool attachment, the member (2) being rotatably mounted on one (1) of the parts and, via a tubular gear, being driven by a separate motor. The motor (10, 11) has a tubular rotor (11) which, along with the tubular gear (4, 5), is concentrically arranged with the tubular member (2) to form a channel for supply and/or communication caples or light beams. The robot wrist exhibits a great orientation capacity in space while having at the same time a relatively small diameter, which enables the insertion of the part (1) into confined spaces.

5 Claims, 2 Drawing Sheets

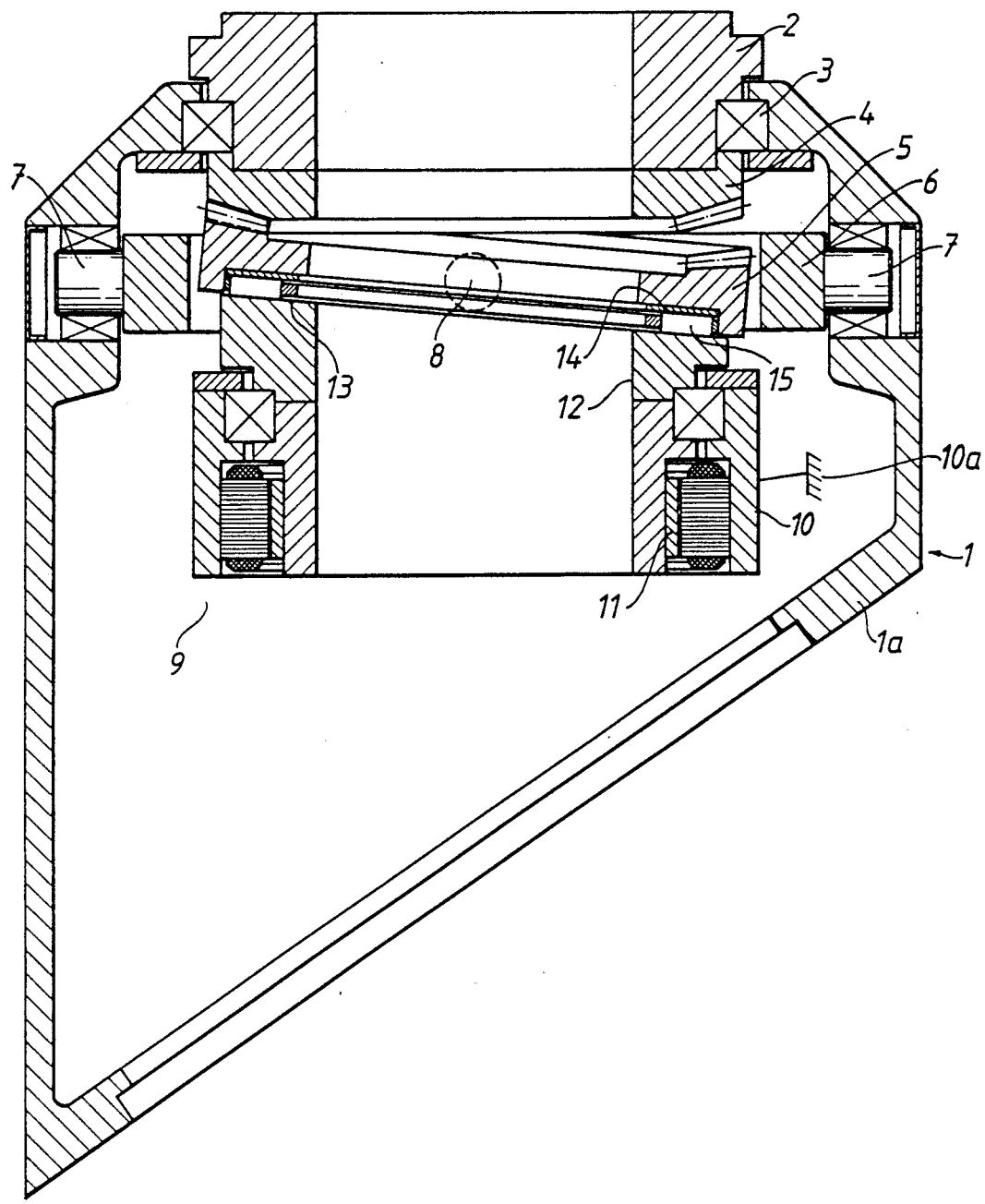

ROBOT WRIST

BACKGROUND AND SUMMARY OF THE INVENTION

The invention relates to a robot wrist.

Modern engineering industry places increasingly heavy demands on the orientation capacity of the arm and wrist of a robot. A plurality of different arm and wrist designs are known which enable a tool to be operated in different positions within a working area. In order for the arm and the wrist to be capable of being operated in the desired manner, a plurality of axes and gears rotating inside the arm and the wrist, and sometimes also separate motors, are additionally required. These units are relatively space-demanding and if, in addition, for example, the wrist is to accomodate hydraulic and/or electric cables for the supply of power to the control carried by the wrist, it may be necessary to construct a relatively thick wrist. This, however, reduces the ability of the robot to operate in confined spaces. In prior art devices, for example according to U.S. Pat. No. 4,690,012 the drive motor for the tool attachment is a fully normal motor mounted at the side of the tubular tool attachment which is driven via a gear. The gear may also to a certain extent occupy lateral space.

The invention aims at developing a robot wrist which, on the one hand, is of relatively slim design and, on the other hand, provides ample through-going inner space to allow the passage of supply and/or communication means through the wrist.

To achieve this aim the invention describes a robot wrist wherein the gear and the motor thereof are built together to form a tubular motor-gear package, which is arranged concentrically with the member, for example a tool attachment, driven by it. Both, the gear wheels and the rotor, are made tubular in order to create a channel for supply and/or communication means. Such means may comprise, for example, hydraulic and/or electric cables, glass fibre cables or mere light or laser light beams. At a given diameter of the channel, the the outer diameter of the wrist will be smaller than if the motor and/or the gear were arranged adjacent to the channel.

The invention will now be described in greater detail, by way of example, with reference to the accompanying drawings.

BRIEF DESCRIPTION OF THE DRAWINGS

FIG. 2 shows a section through the wrist joint 1 in FIG. 1 on an enlarged scale to show the details of one embodiment of the invention.

DETAILED DESCRIPTION OF THE PREFERRED EMBODIMENT

Figure 1:
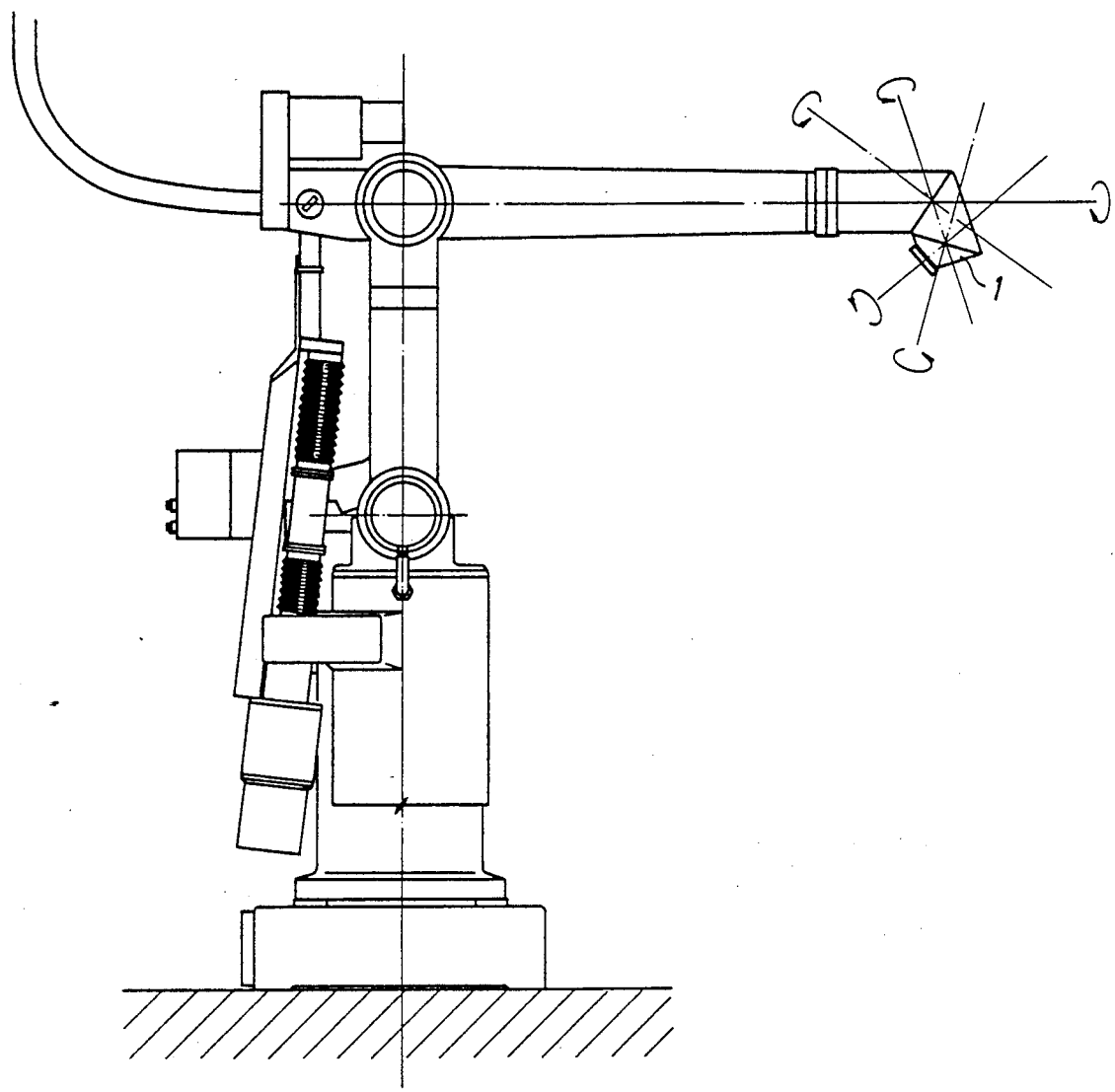
FIG. 1 shows a robot with a robot wrist according to the invention.

In the embodiment of FIG. 1, 1 designates the outer joint of part of a robot wrist. In this part 1, which is shown in more detail in FIG. 2, a tubular tool attachment 2 is rotatably journalled by means of a bearing 3. An annular bevel gear wheel 4 is concentrically fixed to the tool attachment 2. A similarly annular bevel gear wheel 5, meshing with the gear wheel 4, is non-rotatably fixed in relation to the housing 1a of the part 1 by means of a cardinac suspension. The cardanic suspension comprises an outer ring 6 which is tiltably journalled in the outer part 1 by means of the pins 7. Inside this outer ring 6, the annular gear wheel 5, in its turn, is tiltably suspended from the ring 6 by means of the pins 8, the axis of the pins 8 subtending at an angle of 90 degrees with the axis of the pins 7. A tubular motor 9 is concentrically arranged in relation ot the bevel gear pair 4, 5 and the tool attachment 2. The stator 10 of the motor 9 is fixedly joined to the housing 1a of part 1, as symbolically indicated at 10a, whereas the tubular rotor 11 is provided with a similarly tubular shaft 12, the end 13 of which, facing the gear wheel 5, is obliquely shaped. On its side facing the end 13 of the shaft 12, the gear wheel 5 is provided with a turned recess in which a plane washer 14 is placed. A needle roller thrust bearing 15 is inserted into the recess and between the washer 14 and the end 13 of the shaft 12.

When the rotor 11 rotates, its end 13 will, without any major friction, roll off against the gear wheel 5 which, as stated above, does not rotate in relation to the housing 1a and hence the stator 10. Since the end 13 of shaft 12 is oblique and the gear wheel 5 is cardanically suspended, the gear wheel 5 will perform a wobbling movement, whereby the contact point between the gear wheels 4 and 5 travels around their circumference. If it is assumed that the number of teeth on one wheel 5 is 100 and on the other wheel 4 is 98 then the gear wheel 5, during a full revolution of the contact point between the gear wheels, with mesh with 100 teeth in the wheel 4, which thus performs a rotation backwards corresponding to two teeth. In this way, a reduction of 2:100=1:50 is obtained. The direction of rotation can be reversed by giving the gear wheel 5 the lower number of teeth, for example 98, and by giving the gear wheel 4 100 teeth.

In summary, the invention results in a tubular motor-gear package without backlash, which is excellently well suited as drive member for a tool holder mounted on a robot arm, provided that the motor-gear package and tool holder are arranged concentrically in relation to each other, enabling the construction of a thinner robot wrist than prior art robot wrists of similar design.

The part of the robot wrist to which the above-described motor-gear package is mounted need not be the outermost joint of the robot wrist as with the embodiment described above. For example, the tool attachment member 2 may be replaced by a member forming a further part of the robot wrist. This member could be used for further orientation purposes of the wrist. The member 2 could also take the form of an elongated tube to increase the overall length of the robot arm. The robot tool holder could then, for example, be attached to the wrist member 2.

The hollow channel obtained by the invention throughout the robot wrist can be used, for example, to accomodate electric or hydraulic cables to supply energy or other matter to the working area or to allow the passage of communication means, such as a laser light beam.

I claim:

1. A robot wrist comprising a plurality of mutually rotatable tubular parts arranged in series with each other and a tubular member which is rotatably mounted on one said tubular parts and, via a tubular gear, drivable by a separate motor having a tubular rotor, said rotor and said tubular gear being concentrically arranged with said tubular member so as to form a channel for supply and/or communication means.

2. A robot wrist according to claim 1, wherein said tubular gear consists of a so-called nutational gear.

3. A robot wrist according to claim 1 wherein said tubular gear comprises a first annular gear wheel which is fixed to said tubular member and a second gear wheel which is cardanically suspended from a housing of said one part such that it is prevented from rotating about its drive axis relative to the housing.

4. A robot wrist according to claim 1, wherein said one part is the outermost joint of the robot wrist and said tubular member is a tool attachment.

5. A robot wrist through which cables or light beams can freely pass, said robot wrist comprising:

a tubular housing having a mounting end, a tubular member rotatably journalled to said mounting end of said tubular housing, said tubular member including a bevel gear wheel, a tubular motor positioned within said tubular housing so as to be aligned with said tubular member, said tubular motor including a tubular stater fixedly connected to said tubular housing, an inner tubular rotor, and a tubular shaft having an oblique end facing said tubular member, and a nutation gear positioned within said tubular housing so as to be positioned between said tubular shaft and said bevel gear wheel, rotation of said tubular shaft causing said nutation gear to rotate said bevel gear wheel and thus said tubular member, cables or light beams passing into said housing being capable of passing through said tubular rotor, said tubular shaft said nutation gear and said bevel wheel into said tubular member.

* * * * *